Figure 1:
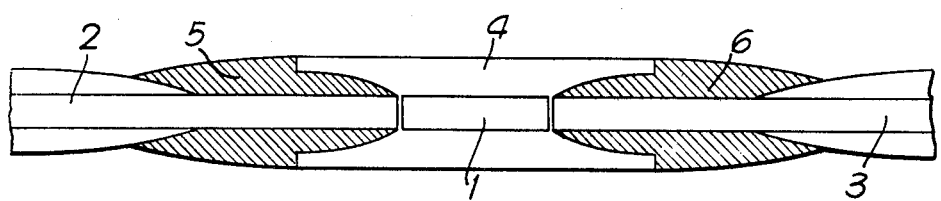

United States Patent [19]

Chown et al.

[11] 4,183,737
[45] Jan. 15, 1980

[54] METHOD OF JOINING OPTICAL FIBERS WITH A LINK PIECE

[75] Inventors: Martin Chown; Anthony W. Horsley, both of Harlow; David G. Dalgoutte, Saffron Walden, all of England

[73] Assignee: International Standard Electric Corporation, New York, N.Y.

[21] Appl. No.: 925,266

[22] Filed: Jul. 17, 1978

[30] Foreign Application Priority Data

Jul. 21, 1977 [GB] United Kingdom ............... 30644/77

[51] Int. Cl.² .......................... C03C 23/20; G02B 5/14
[52] U.S. Cl. ........................................ 65/4 A; 65/4 B; 65/4 R; 65/36; 65/43; 350/96.21; 350/96.22; 350/96.20
[58] Field of Search .................... 65/DIG. 7, 3 A, 36, 65/43, 17, 4 B, 96.22, 4 R, 4 A; 350/96 C, 96.21, 96.20

[56] References Cited

U.S. PATENT DOCUMENTS

| 3,455,625 | 7/1969 | Brumley et al. ................. 65/DIG. 7 |
| 3,579,316 | 5/1971 | Dyott et al. ........................... 65/4 B |
| 3,734,594 | 5/1973 | Trambarulo ........................ 65/43 X |
| 3,825,320 | 7/1974 | Redfern ............................. 350/96.22 |
| 3,829,195 | 8/1974 | Rawson ............................ 65/DIG. 7 |
| 3,944,327 | 3/1976 | Larsen .............................. 65/DIG. 7 |
| 4,008,061 | 2/1977 | Ramsay ..................................... 65/36 |
| 4,028,162 | 6/1977 | Cherin et al. .................... 65/DIG. 7 |
| 4,033,668 | 7/1977 | Presby ............................. 65/DIG. 7 |
| 4,078,910 | 3/1978 | Dalgoutte ............................. 65/3 A |

FOREIGN PATENT DOCUMENTS

| 2657687 | 7/1977 | Fed. Rep. of Germany ........ 350/96.21 |
| 2363987 | 7/1975 | Fed. Rep. of Germany ........ 350/96.21 |

Primary Examiner—S. Leon Bashore
Assistant Examiner—Frank W. Miga
Attorney, Agent, or Firm—John T. O'Halloran; Peter C. Van Der Sluys

[57] ABSTRACT

An optical fiber coupler comprising a glass sleeve having a link piece of single material glass optical fiber having a refractive index higher than the sleeve mounted in a central section of the sleeve. The central section of the sleeve is collapsed to secure the link piece therein, leaving portions of the sleeve beyond the link piece of sufficient cross-section to freely receive optical fibers therein to be optically coupled. An index matching adhesive is used to secure the fibers in the sleeve abutting the link piece.

4 Claims, 2 Drawing Figures

U.S. Patent  Jan. 15, 1980  4,183,737

METHOD OF JOINING OPTICAL FIBERS WITH A LINK PIECE

The present invention relates to an optical fibre jointing such as that described and claimed in our application Ser. No. 845,812 filed Oct. 27, 1977 which is itself an improvement over application Ser. No. 746,903 filed Dec. 2, 1976 now U.S. Pat. No. 4,124,364 issued Nov. 7, 1978.

In the above-mentioned application there is described and claimed a method of making an optical fibre coupler for making an optical fibre coupling between one end of a first optical fibre and one end of a second optical fibre having the same cross-section as the first, which method of coupler manufacture includes the steps of providing a glass sleeve with a bore that is a clearance fit around the fibres, of positioning a link piece of glass optical fibre that has the same cross-section as that of the first and second optical fibres and a length that is shorter than the sleeve in the central section of the sleeve bore to leave the two end sections of the sleeve bore unobstructed, of securing the link piece in position within the sleeve by heating the central section of the sleeve so as to cause it to collapse around the link piece over substantially the whole of its length while leaving the portions of the sleeve bore beyond the link piece ends large enough to accommodate the ends of the first and second fibres. The present invention has for its object the provision of improvements in or modifications of the method of the above-mentioned application, together with the joints produced by the novel methods.

According to the present invention there is provided a method of making an optical fibre coupler for coupling first and second optical fibres of the plastic clad silica or similar type both of which have the same cross-section, which method includes the steps of providing a glass sleeve whose bore is a clearance fit around the fibres; of positioning a link piece of glass optical fibre having the same cross-section as the two fibres to be joined and a length that is less than that of the sleeve in the central section of the sleeve bore to leave the bores of both of the end sections of the sleeve unobstructed, of securing the link piece in position within the sleeve by heating the central section of the sleeve so as to cause it to collapse around the link piece over substantially the whole of its length whilst leaving the portions of the sleeve bore beyond the link piece ends large enough to accommodate the ends of the first and second fibres, and in which the link piece is a single material fibre whose refractive index is higher than that of the collapsed tube, said link piece and said collapsed tube forming a single fibre coupling element.

According to the present invention there is further provided a method of making an optical fibre coupling between first and second optical fibres both of which have the same cross-section, which method includes the steps of providing a glass sleeve whose bore is a clearance fit around the fibre, of positioning a link piece of glass optical fibre having the same cross-section as the two fibres to be joined and a length that is less than that of the sleeve in the central section of the sleeve so as to leave the bores of both of the end sections of the sleeve unobstructed, the link piece consisting of a fibre with a thin cladding whose refractive index is less than that of the link piece core, of securing the link piece in position within the sleeve by heating the central section of the sleeve so as to cause it to collapse around the link piece over substantially the whole of its length whilst leaving the portions of the sleeve bore beyond the link piece ends large enough to accommodate the ends of the first and second fibres, of subjecting the sleeve to further heat so as to over-collapse the walls of the sleeve adjacent to the link piece ends to match the diameter of the link piece core which is similar to that of the fibres to be joined and of inserting the ends of the fibres to be joined after removal of their cladding each into one of the said portions of the sleeve beyond the ends of the link piece together with a cement whose refractive index is less than that of the fibre core.

Embodiments of the invention will now be described with reference to the accompanying FIGS. 1 and 2.

The joint shown in FIG. 1 is similar in many respects to that of the above-mentioned application, and the coupling element proper includes a link piece 1 of a single material optical fibre whose cross-section is the same as that of the two fibres 2 and 3 to be joined. This link piece 1 is inserted into a sleeve 4 of a glass whose refractive index is lower than that of the link piece 1, whereafter the sleeve 4 is heated so that it softens and collapses on to the link piece. However, the portions of the bore cylinder beyond the two ends of the link piece are left unobstructed.

To join the two single material fibres by the element formed by the sleeve 4 and the link piece 1, each of the two fibres to be joined has its cladding stripped off at the end to expose a short length of fibre. Each of these exposed fibre ends is then inserted into one end of the sleeve 4, as shown, and a filling of a low index cement fed in as shown at 5 and 6. This cement acts as an adhesive and also as an index matching cement, some of the cement entering between the link piece and and the fibre end.

Figure 2:
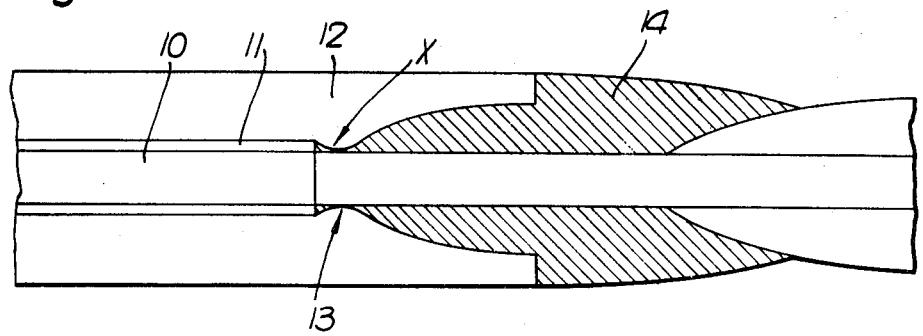

FIG. 2 only shows half of a fibre joint, and is on a larger scale than FIG. 1. Here the link piece 10 has a thin cladding 11, and is secured in place on the sleeve 12 in the same way as was done in the case of FIG. 1. The sleeve is over-collapsed by a further application of heat to produce an annular ridge 13 which gives a bore which is closed fit for the fibre cores to be joined. The fibre end is bared as shown and inserted into the bore of the sleeve. Low index cement is used, as shown in 14 in the same way and for the same purpose as in FIG. 1.

In one embodiment, sleeve 12 is lower refractive index than fibre 3. However, if it is desired to use a sleeve 12 of higher refractive index than that of the fibre 3, (e.g. if the fibre 3 is of pure silica, and the material used for sleeve 12 which has all the required properties is either expensive or unobtainable), the point of contact X must be sufficiently small for the optical loss at that point to be reduced to an acceptable level.

We claim:

1. A method of making an optical fiber coupler for first and second optical fibers both of which have the same core cross-section, which method includes the steps of:

providing a glass sleeve whose bore is a clearance fit around the fibers;

positioning a link piece of glass optical fiber having the same core cross-section as the two fibers to be joined and a length which is less than that of the sleeve in the central section of the sleeve so as to leave the bores of both the end sections of the sleeve unobstructed, the link piece comprising a fiber with a cladding layer whose refractive index is less than that of the link piece core;

securing the link piece in position within the sleeve by heating the central section of the sleeve so as to cause it to collapse around the link piece over substantially the whole of its length while leaving the portions of the sleeve beyond the link piece ends large enough to accommodate the ends of the first and second fibers;

subjecting the sleeve to further heat so as to overcollapse the sleeve portions adjacent to the link piece ends to match the diameter of the link piece core.

2. The method of claim 1 further including the step of inserting the ends of the fibers to be joined after removal of their cladding, each into one of said portions of the sleeve beyond the ends of the link piece together with a cement whose refractive index is less than that of the fiber core.

3. A method as claimed in claim 1, and in which the sleeve material has a refractive index which is higher than that of the fibre.

4. A method as claimed in claim 1, and in which the sleeve material has a refractive index which is lower than that of the fibre.

* * * * *